(12) United States Patent
Sundberg

(10) Patent No.: US 6,919,544 B2
(45) Date of Patent: *Jul. 19, 2005

(54) METHOD TO IMPROVE THE LIFE SPAN OF A HEATING ELEMENT OF A MOLYBDENIUM DISILICIDE AT LOWER TEMPERATURES

(75) Inventor: Mats Sundberg, Västerås (SE)

(73) Assignee: Sandvik AB, sANDVIKEN (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/381,359

(22) PCT Filed: Sep. 25, 2001

(86) PCT No.: PCT/SE01/02060

§ 371 (c)(1),
(2), (4) Date: Mar. 26, 2003

(87) PCT Pub. No.: WO02/26657

PCT Pub. Date: Apr. 4, 2002

(65) Prior Publication Data

US 2004/0056021 A1 Mar. 25, 2004

(30) Foreign Application Priority Data

Sep. 29, 2000 (SE) ................................ 0003512

(51) Int. Cl.⁷ ................................ H05B 3/10
(52) U.S. Cl. ................ 219/548; 219/553; 219/549; 29/610.1
(58) Field of Search ................ 219/547, 548, 219/552, 553, 610.01; 29/611, 613; 428/446, 669; 252/512; 429/52, 199, 221; 501/96.3

(56) References Cited

U.S. PATENT DOCUMENTS

| 3,269,806 | A |   | 8/1966  | Fitzer et al.       | 338/333  |
|-----------|---|---|---------|---------------------|----------|
| 3,635,824 | A | * | 1/1972  | Brandes et al.      | 252/512  |
| 3,763,004 | A | * | 10/1973 | Wainer et al.       | 205/183  |
| 3,895,219 | A | * | 7/1975  | Richerson et al.    | 219/553  |
| 4,433,233 | A | * | 2/1984  | Hierholzer et al.   | 219/553  |
| 4,486,651 | A | * | 12/1984 | Atsumi et al.       | 219/553  |
| 5,186,918 | A | * | 2/1993  | Skeels et al.       | 423/718  |
| 5,420,399 | A | * | 5/1995  | Sekhar et al.       | 219/553  |
| 5,429,997 | A | * | 7/1995  | Hebsur              | 501/96.3 |
| 5,756,215 | A | * | 5/1998  | Sawamura et al.     | 428/446  |
| 6,211,496 | B1| * | 4/2001  | Uchiyama et al.     | 219/548  |
| 6,563,095 | B1| * | 5/2003  | Sundberg            | 219/553  |
| 6,707,016 | B2| * | 3/2004  | Sundberg            | 219/548  |
| 2001/0003336 | A1 | * | 6/2001 | Abbott et al.    | 219/543  |
| 2002/0028360 | A1 | * | 3/2002 | Shaffer et al.   | 428/699  |

FOREIGN PATENT DOCUMENTS

| EP | 0 737 985 A2 | 10/1996 |
| GB | 834739       | 5/1960  |
| SE | 204116       | 5/1966  |
| SE | 210969       | 2/1967  |
| SE | 223265       | 10/1968 |
| WO | WO 96/32358  | 10/1996 |

* cited by examiner

*Primary Examiner*—Robin O. Evans
*Assistant Examiner*—Leonid Fastovsky
(74) *Attorney, Agent, or Firm*—Alfred J. Mangels

(57) ABSTRACT

A method of increasing the length of life of heating elements that consist essentially of molybdenum-silicide, and alloys thereof, when the elements are operated at a low temperature, such as at a temperature ranging from 400–600° C. The heating element material contains $Mo(Si_{1-x}Al_x)_2$, and that material contains sufficient aluminum to substantially prevent the formation of pest.

2 Claims, No Drawings

METHOD TO IMPROVE THE LIFE SPAN OF A HEATING ELEMENT OF A MOLYBDENIUM DISILICIDE AT LOWER TEMPERATURES

BACKGROUND OF THE INVENTION

1. Field of the Invention

The present invention relates to a method of increasing the useful length of heating elements at low temperatures, and more specifically the useful life of elements of the molybdenum-silicide and the molybdenum-tungsten silicide type, including different alloys of these basic materials. Elements of this nature are produced by applicants in a number of forms.

2. Description of the Related Art

When heating elements formed from molybdenum-silicide, molybdenum-tungsten-silicide, and alloys thereof are operated at relatively low temperatures, for example at temperatures around 400–550° C., no protective scale of silicon dioxide, so-called glass skin, will form, as is the case when operating the elements at high temperatures. Instead, the elements are subjected to so-called pest attack, meaning that a non-protective layer of a mixture of $MoO_3$ and $SiO_2$ forms on the surfaces of the elements. This mixture is porous and readily disintegrates, resulting in a significant shortening of the useful life of the elements.

However, there are applications in which such elements are, nevertheless, the best alternative. One example in this regard is found in the heating of LPCVD (Low Pressure Chemical Vapor Deposition) chambers in the manufacture of electronic circuits.

One way of improving the low temperature properties of such heating elements is to pre-oxidize the elements at a temperature of about 1500° C. or higher, so as to form $SiO_2$ scale. Such scale will slow down the formation of pest. Pest occurs as a result of $MoSi_2$ and $O_2$ forming $MoO_3$ and $SiO_2$. This oxide mixture is relatively porous and hence will afford no protection against continued oxidation.

Such methods, however, do not afford satisfactory protection against pest formation.

Another method is described in Swedish Patent Specification No. 0001846-5. This method involves causing the water content of the atmosphere surrounding the elements to be kept low when said elements are operated. This method provides satisfactory protection against pest formation.

The method according to the present invention significantly increases the length of life of such elements.

SUMMARY OF THE INVENTION

The present invention relates to a method of increasing the useful length of life of heating elements that consist essentially of molybdenum-silicide and alloys of this basic material, when the elements are operated at a low temperature, such as a temperature ranging from 400–600° C. inclusive. The heating element material also contains $Mo(Si_{1-x}Al_x)_2$ in an amount sufficient to provide sufficient aluminum to significantly prevent pest formation.

DESCRIPTION OF THE PREFERRED EMBODIMENTS

The present invention is directed to increasing the length of life of heating elements that consist essentially of molybdenum-silicide and alloys of this basic material, when the elements are operated at a low temperature, such as a temperature ranging from 400–600° C. inclusive. Examples of furnaces operated at such temperatures have been mentioned above.

By molybdenum-silicide and alloys of this basic material is meant that the molybdenum-silicide may, for instance, be alloyed with a minor quantity of tungsten.

According to the present invention, the resistance material of the heating element includes $Mo(Si_{1-x}Al_x)_2$ in an amount to provide sufficient aluminum to significantly prevent pest formation.

It has been found, very surprisingly, that no pest or only a very small amount of pest, is formed when a heating element containing such material is operated in such a low temperature range.

This is due to the formation of $Al_2O_3$ on the surfaces of the heating element, thereby reducing pest formation or causing such formation to disappear.

According to one preferred embodiment of the invention, the value of x is in the range of 0.2–0.6. When practicing this embodiment of the invention, very little pest is formed, in comparison with conventional elements used in the low temperature range indicated.

According to a highly preferred embodiment of the invention, the value of x is in the range of 0.45–0.50. No pest is formed when practicing this embodiment. Applicants have run a test in which one such heating element was held at a temperature of 450° C. or twelve months without pest forming. This was a very surprising result.

According to one preferred embodiment of the invention, the heating element material contains up to 40 vol. % $Al_2O_3$. The aluminum oxide constitutes a mechanical element-stabilizing phase.

What is claimed is:

1. A method of increasing the length of life of heating elements containing molybdenum-silicide when said elements are operated at a low temperature, said method comprising the steps of:

providing a material selected from the group consisting of molybdenum-silicide and molybdenum-silicide alloys, wherein the material includes $Mo(Si_{1-x}Al_x)_2$ and wherein aluminum is present in the heating element material in an amount such that x lies in the range of 0.4–0.5; and forming up to 40 vol % $Al_2O_3$ in the material by operating the heating element at a temperature ranging from 400–600° C. in order to provide $Al_2O_3$ on surfaces of the element to prevent the formation of pest on surfaces of heating elements formed therefrom.

2. A heating element based upon molybdenum silicide and providing increased heating element life at temperatures ranging from 400–600° C., said heating element consisting essentially of materials selected from the group consisting of molybdenum silicide and including as a component thereof $Mo(Si_{1-x}Al_x)_2$, said heating element having up to 40 vol % $Al_2O_3$, wherein aluminum is present in the heating element in an amount such that x lies in the range of 0.4–0.5, in order to provide $Al_2O_3$ on surfaces of the heating element to prevent the formation of pest on the surfaces.

* * * * *